US010538335B2

(12) United States Patent
Conti et al.

(10) Patent No.: US 10,538,335 B2
(45) Date of Patent: Jan. 21, 2020

(54) BOUNDARY LAYER INGESTION INTEGRATION INTO AFT FUSELAGE

(71) Applicant: The Boeing Company, Chicago, IL (US)

(72) Inventors: Angelina M. Conti, State College, PA (US); Patrick G. Harvey, Stanford, CA (US); Krunal B. Mistry, Old Bridge, NJ (US); Kimberly A. Rink, Rochester, MN (US); Ted K. Rothaupt, Lancaster, CA (US)

(73) Assignee: THE BOEING COMPANY, Chicago, IL (US)

( * ) Notice: Subject to any disclaimer, the term of this patent is extended or adjusted under 35 U.S.C. 154(b) by 483 days.

(21) Appl. No.: 15/383,104

(22) Filed: Dec. 19, 2016

(65) Prior Publication Data
US 2018/0170560 A1   Jun. 21, 2018

(51) Int. Cl.
*B64D 27/14* (2006.01)
*B64D 29/04* (2006.01)

(52) U.S. Cl.
CPC ............. *B64D 27/14* (2013.01); *B64D 29/04* (2013.01)

(58) Field of Classification Search
CPC ........... B64C 1/06; B64C 1/064; B64C 1/068; B64C 1/16; B64D 27/00; B64D 27/02; B64D 27/08; B64D 27/14; B64D 27/20; B64D 29/04; B64D 33/00
See application file for complete search history.

(56) References Cited

U.S. PATENT DOCUMENTS

| | | | | |
|---|---|---|---|---|
| 2010/0038472 | A1* | 2/2010 | Cazals | B64D 27/20 244/54 |
| 2010/0044502 | A1* | 2/2010 | Cazals | B64D 27/20 244/54 |
| 2012/0138736 | A1* | 6/2012 | Cazals | B64C 1/068 244/54 |
| 2015/0291285 | A1* | 10/2015 | Gallet | F01D 13/02 415/60 |
| 2017/0361939 | A1* | 12/2017 | Negulescu | B64C 1/16 |
| 2017/0369152 | A1* | 12/2017 | Yao | B64D 27/18 |
| 2018/0079514 | A1* | 3/2018 | Ramakrishnan | B64D 27/14 |
| 2018/0086436 | A1* | 3/2018 | Pastouchenko | B64C 5/02 |
| 2018/0086438 | A1* | 3/2018 | Pastouchenko | B64C 1/16 |
| 2018/0093777 | A1* | 4/2018 | Cheung | B64C 21/06 |
| 2018/0127089 | A1* | 5/2018 | Welstead | B64C 21/06 |
| 2018/0134406 | A1* | 5/2018 | Reckzeh | B64D 27/20 |

(Continued)

OTHER PUBLICATIONS

B.Blumenthal; Computational Investigation of a Boundary-Layer Ingestion Propulsion System for the Common Research Model, MS Thesis May 2016.

(Continued)

*Primary Examiner* — Richard R. Green
*Assistant Examiner* — Michael A. Fabula
(74) *Attorney, Agent, or Firm* — Parsons Behle & Latimer

(57) ABSTRACT

Systems and methods for integrating Boundary Layer Ingestion (BLI) apparatus into an aircraft (1). The longerons (34) in the aft fuselage (18) may be extended to support an aft propulsor (20). The aft propulsor may be a turbofan or turboelectric propulsion system (46). An upper longeron (34a) may support a tail section (14) of an aircraft. The aft fuselage skin (22) is contoured to permit boundary layer airflow to enter an intake fan (24) of the aft propulsor.

20 Claims, 6 Drawing Sheets

(56) References Cited

U.S. PATENT DOCUMENTS

2018/0156109 A1* 6/2018 Suciu .................. F02C 6/08
2018/0170563 A1* 6/2018 Bouchet ............... B64C 1/061
2018/0340493 A1* 11/2018 Cazals ................. F02K 1/70
2018/0354634 A1* 12/2018 Jodet .................. F02C 7/24

OTHER PUBLICATIONS

Welstead et al; Conceptual Design of a Single-Aisle Turboelectric Commercial Transport with Fuselage Boundary Layer Ingestion; AIAA Paper Jan. 4, 2016.

* cited by examiner

| | UNITS | BLI 3-CORE 700 | BLI TURBOELECTRIC 702 |
|---|---|---|---|
| MTOW | lb | +5100 | +17000 |
| OEW | lb | +6200 | +14000 |
| PASSENGER COUNT | - | SAME | SAME |
| WING AREA | ft$^2$ | +33 | +111 |
| SPAN | ft | SAME | SAME |
| ASPECT RATIO | - | -0.2 | -0.7 |
| MID-CRUSIE L/D | - | +0.1 | -0.1 |
| SEA LEVEL STATIC THRUST WING / BLI | lb | -4412 / +11,500 | -2400 / +11,200 |
| MID-CRUISE SFC WING / BLI | lb/hr/bf | -0.016 / -0.101 | +0.001 / -0.021 |
| BLOCK FUEL PER SEAT (1000 NM) | lb | -5.6% | +5.6% |

BOUNDARY LAYER INGESTION INTEGRATION INTO AFT FUSELAGE

FIELD OF THE DISCLOSURE

This disclosure relates generally to Boundary Layer Ingestion ("BLI") for aircraft. In particular, the disclosure relates to apparatus and methods for integrating BLI into an aircraft structure.

BACKGROUND

Boundary Layer Ingestion ("BLI") typically involves placing the intake of a propulsion system close to the surface of the fuselage, which is usually accomplished by mounting the propulsion system to the aft section of an aircraft fuselage where the lower velocity of the boundary layer airflow can be ingested by the aft propulsion intake. The lower momentum boundary layer flow can then be used to increase engine performance. Conceptual designs and models for BLI exist, such as, for example, NASA's STARC-ABL (Single-aisle Turbo-electric Aircraft with an Aft Boundary Layer propulsor) concept, however, to date there has not been a detailed design of the external and internal structural integration of the aft fuselage and the aft propulsor. Thus, ambiguities exist with the design, shaping, mounting, and integration into the aircraft structure for elements of a BLI system such as the aft engine, aft fuselage, aft fuselage skin, aft longerons, and the like.

In addition, existing BLI models and conceptual designs by, among other things, their conceptual nature, lack the detail necessary to accurately determine the weight, cost, and desired manufacturing techniques for such an aircraft. Other drawbacks of existing systems also exist.

SUMMARY

Accordingly, the present disclosure provides systems and methods for addressing the above-noted deficiencies and drawbacks of existing systems and methods. For example, disclosed embodiments allow more accurate determinations of the weights, costs, and manufacturing techniques of implementing such a system.

Disclosed embodiments include apparatus comprising an extended longeron extending aft from a fuselage, an aft propulsor comprising an intake fan, a connection point between the extended longeron and an aft fuselage skin and wherein the aft fuselage skin is contoured to enable the flow of boundary layer air into the intake fan of the aft propulsor, and wherein the extended longeron supports the aft propulsor.

Further embodiments may include a second extended longeron extending aft from the fuselage, a third extended longeron extending aft from the fuselage, and wherein the three extended longerons are spaced with substantially 120 degrees of angular separation about a central axis; and wherein the three extended longerons support the aft propulsor. Still further embodiments include structural members extending radially from the three extended longerons to a bearing on a central shaft coupled to the aft propulsor.

In some embodiments, the extended longeron is a vertical tail boom for a vertical stabilizer of a tail section. In some embodiments, the aft propulsor further comprises a turbofan or turboelectric propulsion system. In some embodiments, the extended longeron supports the aft propulsor by coupling to a nacelle that houses the aft propulsor within.

Disclosed methods for integrating BLI apparatus into an aircraft include, coupling an extended longeron to an aft fuselage, connecting aft fuselage skin to the extended longeron wherein the aft fuselage skin is contoured to enable the flow of boundary layer air into an intake fan of an aft propulsor, and coupling the extended longeron to the aft propulsor to support the aft propulsor.

Further embodiments include coupling a second extended longeron to the aft fuselage, coupling a third extended longeron to the aft fuselage, and wherein the three extended longerons are spaced with substantially 120 degrees of angular separation about a central axis, and wherein the three extended longerons support the aft propulsor.

Still further embodiments include coupling structural members extending radially from the three extended longerons to a bearing on a central shaft coupled to the aft propulsor. Some embodiments include coupling a tail section to the extended longeron.

In embodiments where the aft propulsor is a turboelectric device the disclosed methods may include coupling a second turboelectric device to an underwing location.

Disclosed embodiments also include an aircraft comprising a fuselage, an extended longeron extending aft from the fuselage, an aft propulsor comprising an intake fan, a connection point between the extended longeron and an aft fuselage skin and wherein the aft fuselage skin is contoured to enable the flow of boundary layer air into the intake fan of the aft propulsor, and wherein the extended longeron supports the aft propulsor.

Further disclosed embodiments of the aircraft include a second extended longeron extending aft from the fuselage, a third extended longeron extending aft from the fuselage, and wherein the three extended longerons are spaced with substantially 120 degrees of angular separation about a central axis, and wherein the three extended longerons support the aft propulsor. Still further embodiments include structural members extending radially from the three extended longerons to a bearing on a central shaft coupled to the aft propulsor.

In some embodiments, the extended longeron is a vertical tail boom for a vertical stabilizer of a tail section. In some embodiments, the aft propulsor further comprises a turbofan or turboelectric propulsion system. In some embodiments, the extended longeron supports the aft propulsor by coupling to a nacelle that houses the aft propulsor within.

In some embodiments, the aircraft is an unmanned aircraft.

In some embodiments, the aircraft includes an underwing turbofan propulsor.

In some embodiments, the aft propulsor is a turboelectric device and the aircraft further comprises a second turboelectric device in an underwing location. Other embodiments and features are also disclosed.

Figure 1:
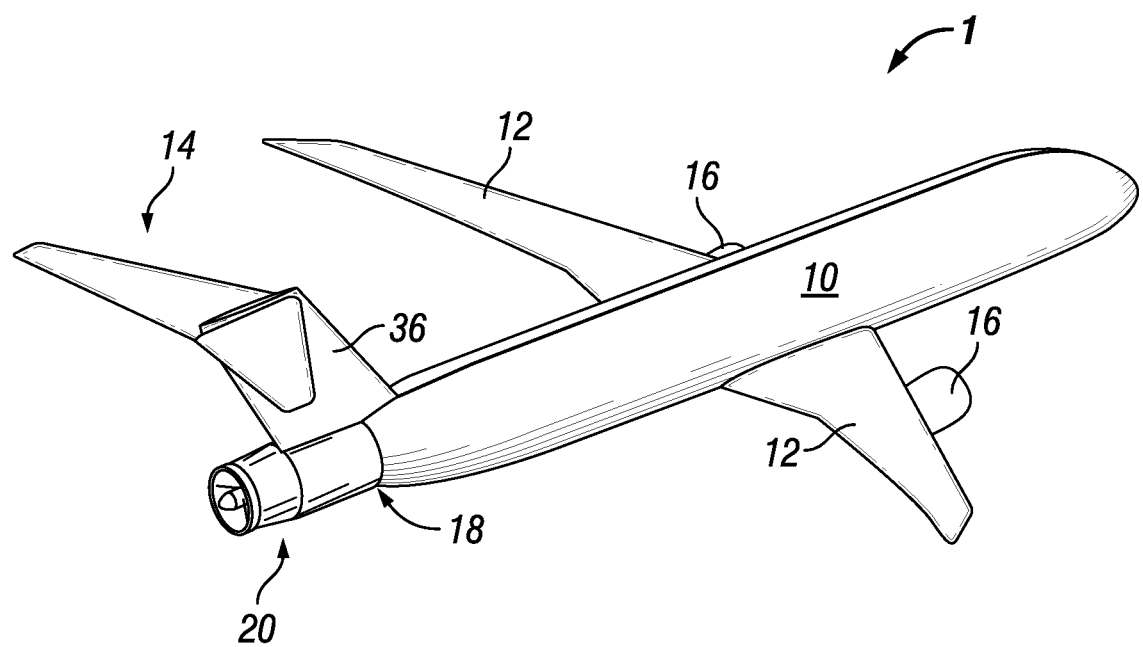
FIG. 1 is an isometric schematic view of an aircraft with BLI integration in accordance with disclosed embodiments.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION

FIG. 1 is an isometric schematic view of an aircraft 1 with BLI integration in accordance with disclosed embodiments. As shown, aircraft 1 may comprise a fuselage 10, wings 12, a tail section 14, engines 16 and other components as is known. As disclosed herein, a portion of the aft fuselage 18 may serve as a mounting location for BLI integration apparatus 20. While FIG. 1 shows aircraft 1 generally as a commercial passenger aircraft, the disclosed embodiments are not so limited and aircraft 1 may comprise a military aircraft, an unmanned aircraft, or the like.

Figure 2:
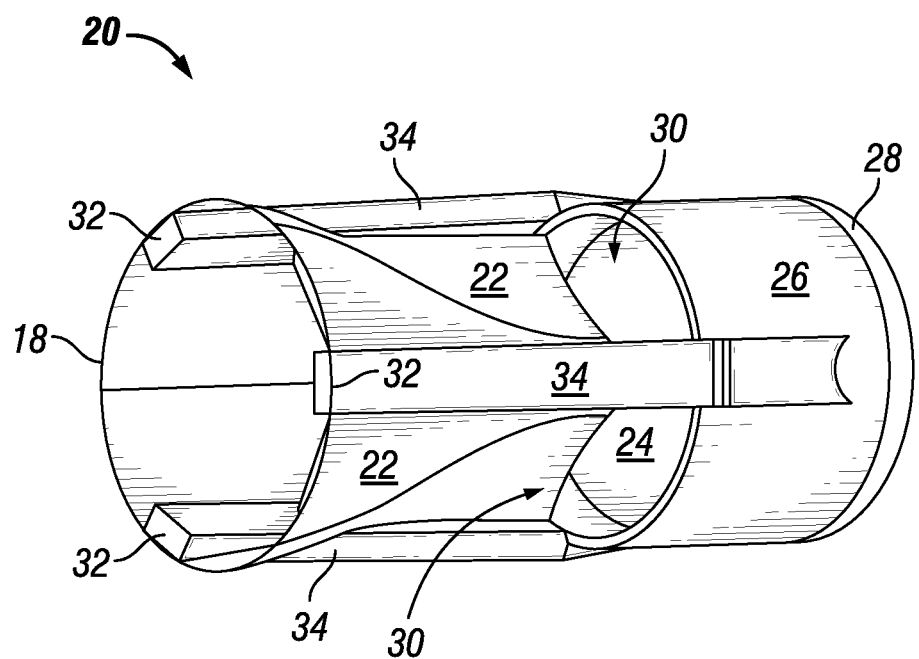
FIG. 2 is an isometric schematic view of an aft fuselage of an aircraft with BLI integration apparatus in accordance with disclosed embodiments.

FIG. 2 is an isometric schematic view of an aft fuselage 18 of an aircraft with BLI integration apparatus 20 in accordance with disclosed embodiments. As shown, aft fuselage skin 22 is shaped, contoured, or sloped to create entry paths for boundary layer airflow to reach an intake fan 24 housed in a nacelle 26 of an aft propulsor 28. The contoured shape of the aft fuselage skin 22, with its smooth contours, allows the boundary layer air flow to remain attached to the fuselage 10 while also funneling the flow towards the fan 24. The contoured shape of the aft fuselage skin 22 provides cavities 30 with large surface areas for low momentum flow to continue to collect and travel to the fan 24, and also allows points of connection 32 with the aircraft 1 structural longerons 34. As shown in FIG. 1, the aft fuselage 18 is designed to integrate smoothly with the rest of the fuselage 10 and, in some embodiments, with the vertical stabilizer 36 of tail section 14.

In some embodiments, as shown in the figures, it may be advantageous to integrate the BLI integration apparatus 20 with the aircraft 1 by using three longerons 34. Other configurations may also be used. As also shown, in some embodiments, the longerons 34 may extend past the aft fuselage skin 22 and serve as attachment points for a nacelle 26 of an aft propulsor 28.

Figure 3A:
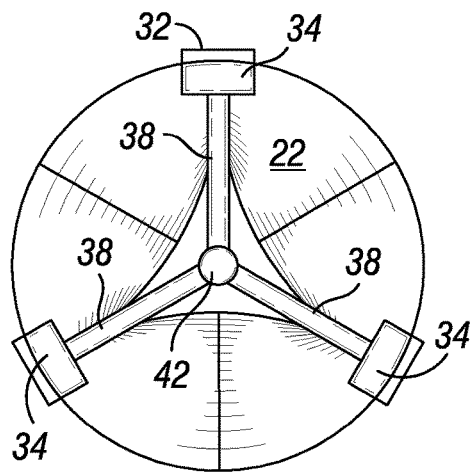
FIGS. 3A-3C are front, side isometric, and top isometric views of an aft fuselage of an aircraft with BLI integration apparatus in accordance with disclosed embodiments.
Figure 3B:
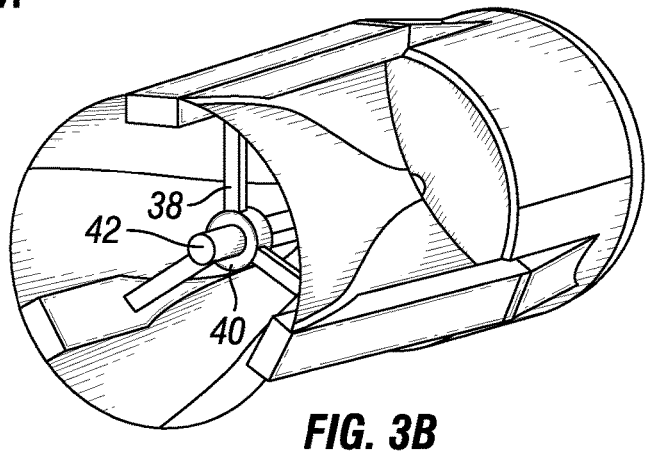
Figure 3C:
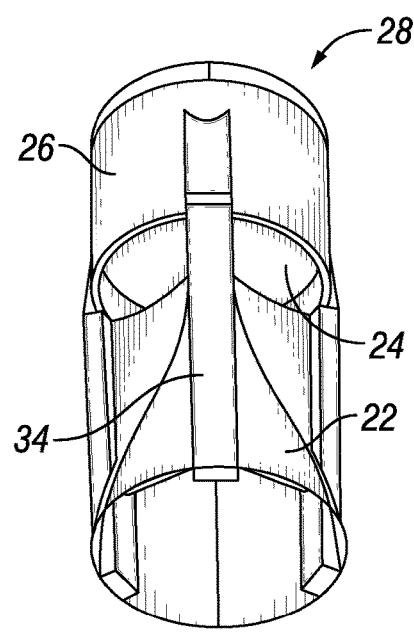

In some embodiments, structural members 38 inside the aft fuselage attach to the longerons 34 and connect to a bearing 40 around a shaft 42, as best shown in FIGS. 3A-3B. While three structural members 38 are shown equally distributed substantially 120 degrees apart around shaft 42, they need not be so and other configurations are also possible.

Using three separate longerons 34 provides sufficient bending and torsional strength to hold up the aft propulsor 28 without requiring excessive connection points 32 that block flow into the fan 24. Additionally, using longerons 34 to attach the aft fuselage 18 and the aft propulsor 28 allows each component to be manufactured independently which may result in cost savings, ease of maintenance, and other efficiencies.

Figure 4A:
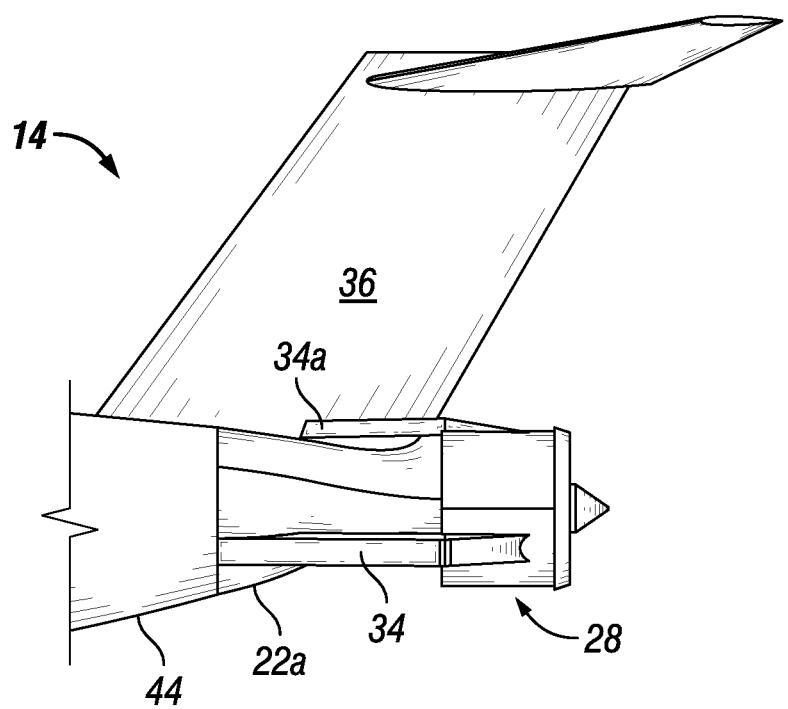
FIGS. 4A-4B are side and rear views of an aft fuselage of an aircraft with BLI integration apparatus in accordance with disclosed embodiments.
Figure 4B:
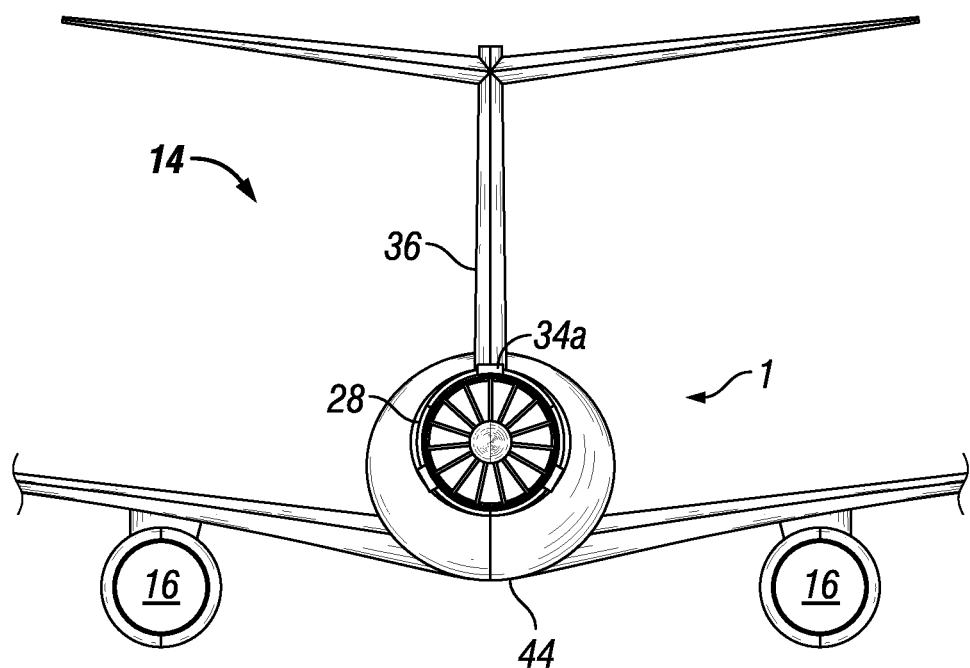

In some embodiments, a top longeron 34a may be multifunctional because it may also serve as the vertical tail boom for the vertical stabilizer 36 of tail section 14 as shown in FIGS. 4A-4B. Among other things, the multifunction of top longeron 34a reduces the number of structural components needed to integrate the BLI integration apparatus 20. It may be desirable in some embodiments to make the top longeron 34a larger and include supporting structure for the tail section 14.

As best shown in FIGS. 4A-4B, some embodiments may incorporate a bottom aft fuselage skin 22a that is contoured to match the bottom fuselage skin 44 of the aircraft 1 while still directing boundary layer airflow into the aft propulsor 28. Among other things, the matching of contours with the bottom fuselage skin 44 may facilitate normal take-off and landing operations for the aircraft 1.

The disclosed BLI integration apparatus 20 is applicable to both turbofan and turboelectric aft propulsors 28. As disclosed herein, the integration of the fuselage 10 with the aft propulsor 28 incorporates the shaft 42, fan 24, and nacelle 26 which are present in both types of propulsor, so either turbofan or turboelectric BLI engines can be integrated into aircraft 1. Of course, depending on the embodiment used, appropriate fuel lines or electric cables from wing mounted generators can be run through the fuselage 10 to power either propulsion system.

Figure 5A:
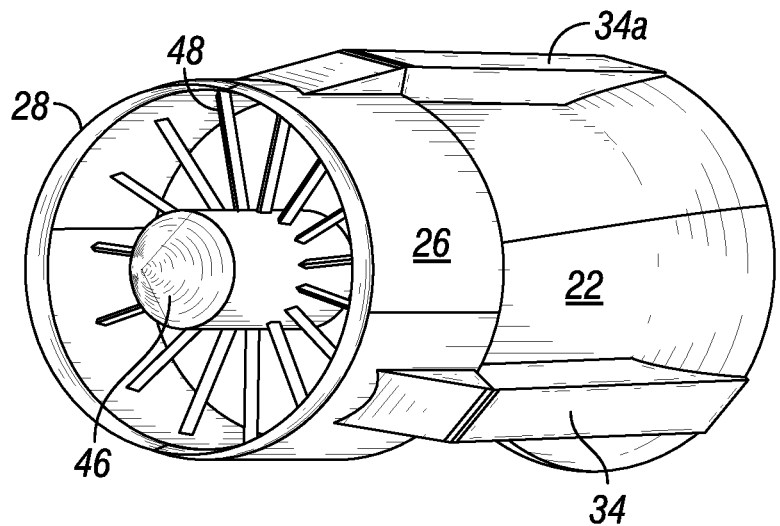
FIGS. 5A-5B are side isometric and rear views of an aft fuselage of an aircraft with BLI integration apparatus in accordance with disclosed embodiments.
Figure 5B:
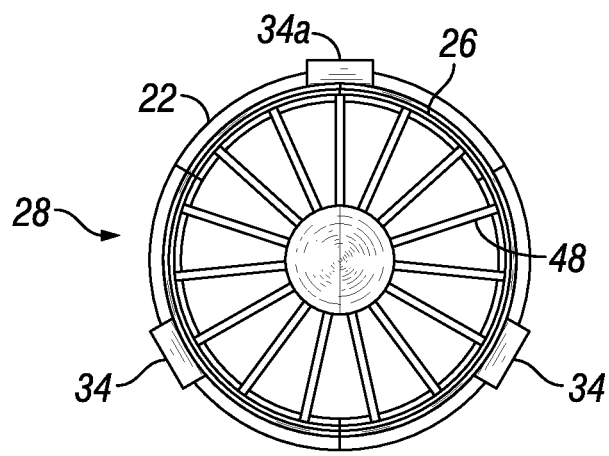

An embodiment of the aft propulsor 28 is schematically shown in FIGS. 5A-5B. As shown schematically for turbofan embodiments, the aft propulsor 28 item 46 may comprise an engine core, and item 48 may comprise a turbine, which both may be housed within nacelle 26. In turboelectric embodiments the aft propulsor 28 item 46 may comprise an electric generator that powers other electric motor propulsors, or item 46 may comprise an electric motor that provides thrust. Other configurations are also possible.

Figures 6, 7:
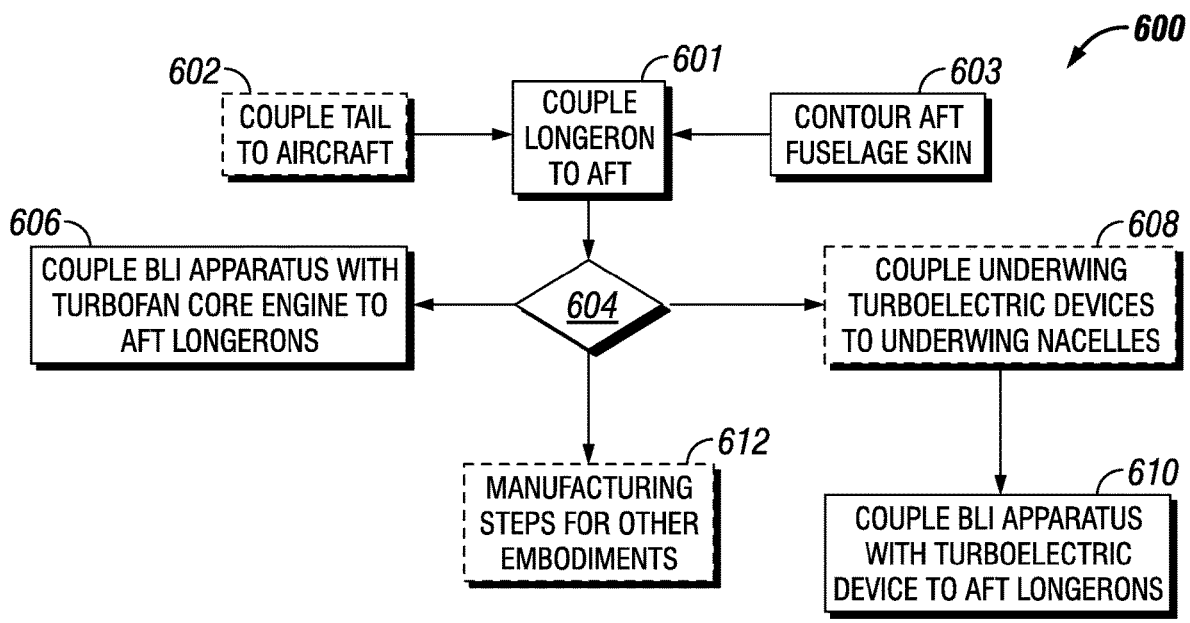
FIG. 6 is a flow chart of disclosed methods for integrating BLI apparatus into an aircraft.
FIG. 7 is a chart comparing weight and flight parameters for disclosed embodiments.

FIG. 6 is an exemplary flow chart illustrating a method 600 of integrating BLI apparatus into an aircraft 1 in accordance with disclosed embodiments. Method 600 may be performed to retro-fit an existing aircraft 1 or build a new aircraft 1. Likewise, while two variants of aircraft 1 (e.g., turbofan embodiment or turboelectric embodiment) other embodiments, combinations, and hybrids may also be created and method 600 may be adapted accordingly. Further, the ordering of steps in method 600 may be rearranged or performed simultaneously as desired. As shown at 601 longerons (e.g., longerons 34) may be extended and coupled to the aft fuselage (e.g., aft fuselage 18). At optional step 602, a T-tail assembly (e.g., tail section 14) may be coupled to an aircraft 1 if one is not already present. At step 603 the skin of aft fuselage (e.g., aft fuselage skin 22 and bottom fuselage skin 22a) is contoured as disclosed herein. Step 604 represents the variants of the method 600 in accordance with the particular embodiment of aircraft 1 and BLI integration apparatus 20 being made. For example, if a turbofan engine is part of BLI integration apparatus 20 and it is being incorporated into an aircraft 1 with two other under-wing turbofan engines, at step 606 the BLI integration apparatus 20, including the turbofan core engine, is coupled to the aft longerons (e.g. longerons 34 and 34a). Similarly, if turboelectric propulsion is to be integrated into aircraft 1, at optional step 608 underwing turboelectric devices (e.g., electric motors, generators, or other electric propulsors) may be coupled to aircraft 1 at a suitable location (e.g., the underwing nacelles for engines 16). Of course, step 608 need not be performed if turboelectric devices already exist in underwing locations on aircraft 1. At step 610 BLI integration apparatus 20, including a turbo-electric device (e.g., electric motors, generators, or other electric propulsors), is coupled to the aft longerons (e.g. longerons 34 and 34a). Optional step 612 represents other manufacturing steps for other types of aircraft 1, or for other combinations of BLI apparatus, such as including a BLI turboelectric generator at the aft of aircraft 1 with turbojet underwing engines, or the like.

The herein disclosed embodiments for integrating BLI apparatus 20 into an aircraft 1 provide sufficient detail to enable calculations of the weights, costs, aerodynamic performance, fuel savings, and the like. For example, FIG. 7 is a comparison to a baseline Boeing 737-sized aircraft for an embodiment of an aircraft with BLI integration apparatus 20 comprising a turbofan engine in the aft propulsor 28 (the "BLI 3-Core embodiment"), and an embodiment of an aircraft with BLI integration apparatus 20 comprising a turboelectric propulsor in the aft propulsor 28 (the "BLI turboelectric embodiment"). Column 700 lists calculated differences of several characteristics for the BLI 3-Core embodiment and column 702 lists the same for the BLI turbo-electric embodiment. As shown, the Maximum Take-off Weight (MTOW) and Operating Empty Weight (OEW) for both the BLI 3-Core and BLI Turboelectric embodiments increase due to, among other things, the weight of the additional aft propulsor 28 and other BLI integration apparatus 20 components. In FIG. 7, the two values shown in the row for sea level static thrust/BLI correspond to underwing engines/BLI engines. Conservative calculations show the BLI 3-Core embodiment has a net savings of 5.6% in block fuel per seat, and the BLI turbo-electric embodiment has a relatively small increase of 5.6% in block fuel per seat given the relatively large increases in MTOW and OEW.

Figure 8:
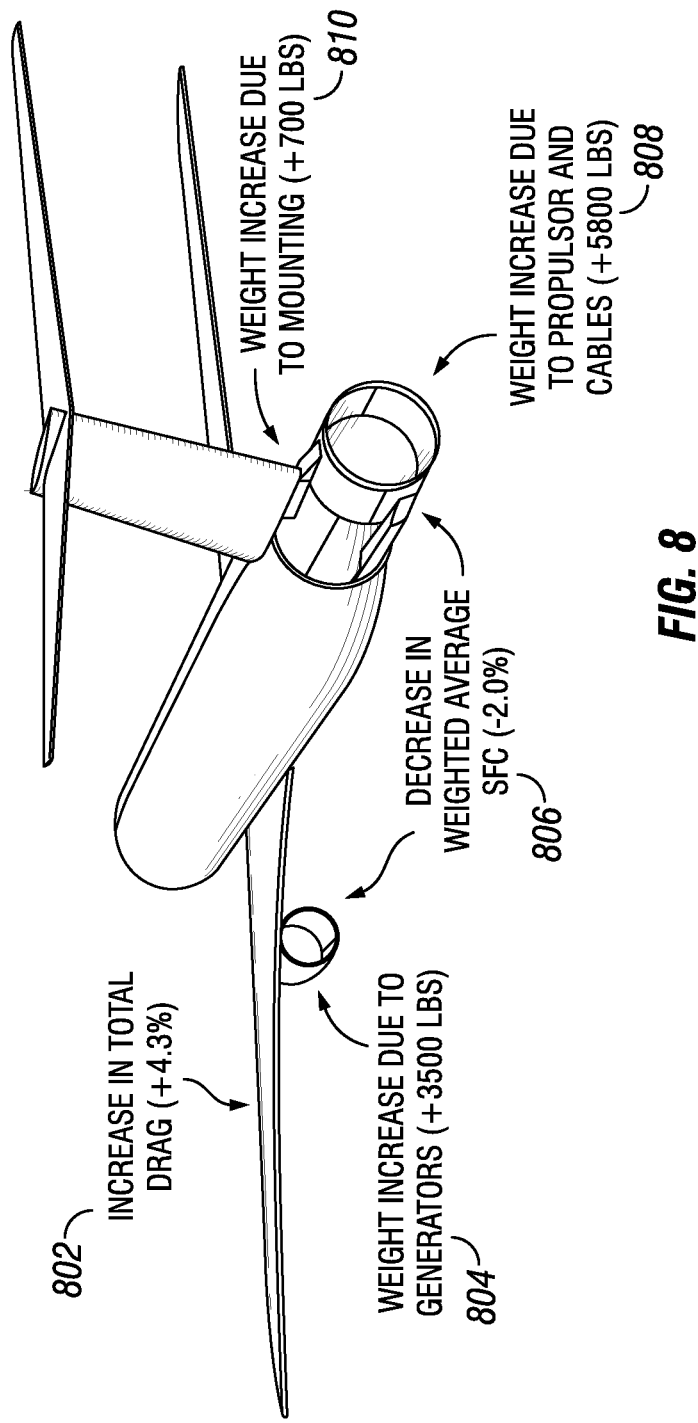
FIG. 8 is a schematic illustration of weight and flight parameters for disclosed embodiments.

Another exemplary calculation of some parameters compared to a baseline Boeing 737 aircraft is shown in FIG. 8 which is a schematic representation of flight and weight parameters for a BLI turboelectric embodiment. As shown for this embodiment, at 802 the increase in total drag due to the BLI integration is an increase of 4.3%. The weight increase due to underwing turboelectric devices, indicated at 804, is 3500 lb per device. Indicated at 806 is the 2.0% decrease in weighted average Specific Fuel Consumption (SFC). As indicated at 808 the increase in weight due to the aft propulsor and associated cables is 5800 lb and the increase in weight due to mounting components, indicated at 810, is 700 lb. Of course, other configurations and calculations are possible as described herein.

Although various embodiments have been shown and described, the present disclosure is not so limited and will be understood to include all such modifications and variations are would be apparent to one skilled in the art.

What is claimed is:

1. An apparatus comprising:
   an extended longeron (34) extending aft from a fuselage (10);
   a second extended longeron (34) extending aft from the fuselage;
   a third extended longeron (34) extending aft from the fuselage; and
   wherein the three extended longerons are spaced with substantially 120 degrees of angular separation about a central axis, wherein the three extended longerons support an aft propulsor with structural members (38) extending radially from the three extended longerons to a bearing (40) on a central shaft (42) coupled to the aft propulsor;
   the aft propulsor (20) having an inner diameter that is smaller than an outer diameter of the fuselage and further comprising an intake fan (24); and
   a connection point (32) between the extended longeron and an aft fuselage skin (22) and wherein the aft fuselage skin is contoured to enable the flow of boundary layer air into the intake fan of the aft propulsor.

2. The apparatus of claim 1 wherein the extended longeron is a vertical tail boom (34a) for a vertical stabilizer (36) of a tail section (14).

3. The apparatus of claim 1 wherein the aft propulsor further comprises a turbofan or turboelectric propulsion system (46).

4. The apparatus of claim 1 wherein the three extended longerons support the aft propulsor by coupling to a nacelle (26) that houses the aft propulsor within.

5. The apparatus of claim 1 wherein the apparatus is an unmanned aircraft.

6. The apparatus of claim 1 further comprising:
   an underwing turbofan propulsor 20.

7. The apparatus of claim 1 wherein the aft propulsor is a turboelectric device and the apparatus further comprises:
   a second turboelectric device (46) in an underwing location (16).

8. A method for integrating Boundary Layer Ingestion (BLI) apparatus into an aircraft, the method comprising:
   coupling an extended longeron to an aft fuselage (601);
   coupling a second extended longeron to the aft fuselage (601);
   coupling a third extended longeron to the aft fuselage (601); and
   wherein the three extended longerons are spaced with substantially 120 degrees of angular separation about a central axis; and
   wherein the three extended longerons support an aft propulsor by coupling structural members extending radially from the three extended longerons to a bearing on a central shaft coupled to the aft propulsor (612) and wherein the aft propulsor has an inner diameter that is smaller than an outer diameter of the aft fuselage; and
   connecting aft fuselage skin to the three extended (603) wherein the aft fuselage skin is contoured to enable the flow of boundary layer air into an intake fan of the aft propulsor.

9. The method of claim 8 further comprising:
   coupling a tail section to the extended longeron (602).

10. The method of claim 8 wherein the aft propulsor is a turboelectric device and the method further comprises:
    coupling a second turboelectric device to an underwing location (608).

11. The method of claim 8 wherein the method further comprises integrating BLI apparatus into an unmanned aircraft.

12. The method of claim 8 wherein the extended longeron is a vertical tail boom (34a) for a vertical stabilizer (36) of a tail section (14).

13. The method of claim 8 wherein the three extended longerons support the aft propulsor by coupling to a nacelle (26) that houses the aft propulsor within.

14. An aircraft (1) comprising:
    a fuselage (10);
    an extended longeron (34) extending aft from the fuselage;

a second extended longeron (34) extending aft from the fuselage;

a third extended longeron (34) extending aft from the fuselage; and wherein the three extended longerons are spaced with substantially 120 degrees of angular separation about a central axis; and wherein the three extended longerons support an aft propulsor with structural members (38) extending radially from the three extended longerons to a bearing (40) on a central shaft (42) coupled to the aft propulsor;

the aft propulsor (20) having an inner diameter that is smaller than an outer diameter of the fuselage and further comprising an intake fan (24); and a connection point (32) between the extended longeron and an aft fuselage skin (22) and wherein the aft fuselage skin is contoured to enable the flow of boundary layer air into the intake fan of the aft propulsor.

15. The aircraft of claim 14 wherein the extended longeron is a vertical tail boom (34a) for a vertical stabilizer (36) of a tail section (14).

16. The aircraft of claim 14 wherein the aft propulsor further comprises a turbofan or turboelectric propulsion system (46).

17. The aircraft of claim 14 wherein the three extended longerons support the aft propulsor by coupling to a nacelle (26) that houses the aft propulsor within.

18. The aircraft of claim 14 wherein the aircraft is an unmanned aircraft.

19. The aircraft of claim 14 further comprising:
an underwing turbofan propulsor 20.

20. The aircraft of claim 14 wherein the aft propulsor is a turboelectric device and the aircraft further comprises:
a second turboelectric device (46) in an underwing location (16).

* * * * *